US010164923B2

(12) United States Patent
Bastide et al.

(10) Patent No.: US 10,164,923 B2
(45) Date of Patent: Dec. 25, 2018

(54) METHODOLOGY THAT USES CULTURE INFORMATION AS A MEANS TO DETECT SPAM

(71) Applicant: International Business Machines Corporation, Armonk, NY (US)

(72) Inventors: Paul R. Bastide, Boxford, MA (US); Ralph E. LeBlanc, Jr., Pepperell, MA (US); Fang Lu, Billerica, MA (US); Alaa Abou Mahmoud, Dracut, MA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/923,532

(22) Filed: Jun. 21, 2013

(65) Prior Publication Data

US 2014/0379812 A1     Dec. 25, 2014

(51) Int. Cl.
H04L 12/58     (2006.01)
(52) U.S. Cl.
CPC .................................... *H04L 51/12* (2013.01)
(58) Field of Classification Search
CPC ............................. H04L 51/12; H04L 12/585
See application file for complete search history.

(56) References Cited

U.S. PATENT DOCUMENTS

| | | | |
|---|---|---|---|
| 7,257,564 B2 | 8/2007 | Loughmiller et al. | |
| 7,406,503 B1 * | 7/2008 | Little, II | G06Q 10/107 709/206 |
| 8,095,547 B2 | 1/2012 | Jeong et al. | |
| 8,782,157 B1 * | 7/2014 | Hansen | 709/206 |
| 8,782,158 B2 * | 7/2014 | Cropper | H04L 67/22 709/206 |
| 2007/0028214 A1 * | 2/2007 | Shu | G06F 9/4448 717/120 |
| 2007/0260448 A1 * | 11/2007 | Lorenzen | G06F 17/274 704/1 |
| 2009/0248487 A1 | 10/2009 | Hueter | |
| 2009/0276208 A1 * | 11/2009 | Pagan | G06F 17/274 704/9 |
| 2009/0319270 A1 * | 12/2009 | Gross | G10L 17/26 704/246 |
| 2011/0282948 A1 * | 11/2011 | Vitaldevara | G06Q 10/10 709/206 |
| 2014/0006522 A1 * | 1/2014 | Syrowitz | G06Q 10/107 709/206 |

OTHER PUBLICATIONS website http://timtrott.co.uk/culture-codes/, a comprehensive list of ISO culture codes published Jul. 2010.*
Shigeko Okamoto, The use and interpretation of addressee honorifics and plain forms in Japanese: Diversity, multiplicity, and ambiguity, 2011, Journal of Pragmatics, 43 , 3673-3688).*

* cited by examiner

*Primary Examiner* — Ranodhi Serrao
(74) *Attorney, Agent, or Firm* — Terrile, Cannatti & Chambers, LLP; Stephen A. Terrile (57) ABSTRACT

A method, system and computer-usable medium are disclosed for using culture-related information for detecting spam. Cultural aspect data corresponding to a recipient or a sender of an electronic communication is processed to generate spam detection rules, which are in turn used to detect electronic communications that may be spam.

20 Claims, 5 Drawing Sheets

METHODOLOGY THAT USES CULTURE INFORMATION AS A MEANS TO DETECT SPAM

BACKGROUND OF THE INVENTION

Field of the Invention

The present invention relates in general to the field of computers and similar technologies, and in particular to software utilized in this field. Still more particularly, it relates to a method, system and computer-usable medium for using culture-related information for detecting spam.

Description of the Related Art

Electronic communications have become a part of everyday life and currently include electronic mail (email), instant messaging (IM), online chat, or Short Message Service (SMS) messages. Other forms of electronic communications include posts on social network sites, online forums, blogs and microblogs. All of these are conducive to the delivery of spam (i.e., unsolicited, often bulk generated, electronic communications), which can be harmful to users in many ways. For example, a user's private information may be stolen, their accounts can be hacked, their financial information may be compromised, or their public image may be harmed.

In a common scenario, a user receives an email message with an unfamiliar URL in the message body from someone posing as a friend or colleague. As a result, the user may implicitly trust the URL and click on it, resulting in a virus or other malware being installed on their computer. It is also becoming increasingly common for user accounts in social network environments to be hacked and then used to broadcast spam to the accounts of the user's "friends."

Existing approaches to detecting spam include the use of heuristics, word analysis, "black" lists, and "white" lists. As an example, various email programs allow users to filter email messages from known senders of spam and file them in a "bulk" or "deleted" box instead of the user's "in" box. Other examples of filtering approaches include domain name system blacklist (DNSBL), uniform resource identifier blacklist (URIBL), right-hand side blacklist (RHSBL), dynamic real-time block list (DynRBL) and domain name system whitelist (DNSWL). However, such approaches fail to take into account known cultural aspects, such as the sender's and recipient's respective ethnic background, language, religion, social status, and so forth.

SUMMARY OF THE INVENTION

A method, system and computer-usable medium are disclosed for using culture-related information for detecting spam. In various embodiments, data associated with predetermined cultural aspects corresponding to a recipient or a sender of an electronic communication is processed to generate spam detection rules, which are in turn used to detect electronic communications that may be spam. In certain embodiments, spam detection rules associated with both the recipient and the sender of the electronic communication are used to detect electronic communications that may be spam.

In various embodiments, data associated with predetermined cultural aspects corresponding to users of electronic communications is processed to generate cultural aspect spam detection rules. In certain embodiments, the cultural aspect spam detection rules may include rules associated with terms of salutation, greetings and languages for various cultures.

In these embodiments, the sender and the recipient of an electronic communication is determined, followed by determining whether the sender is a known source of spam. If so, then the electronic communication is marked as possible spam. Otherwise, the electronic communication is processed to identify associated cultural aspects. The cultural aspect spam detection rules are then used to process the identified cultural aspects to determine whether the electronic communication is spam.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for using culture-related information for detecting spam. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
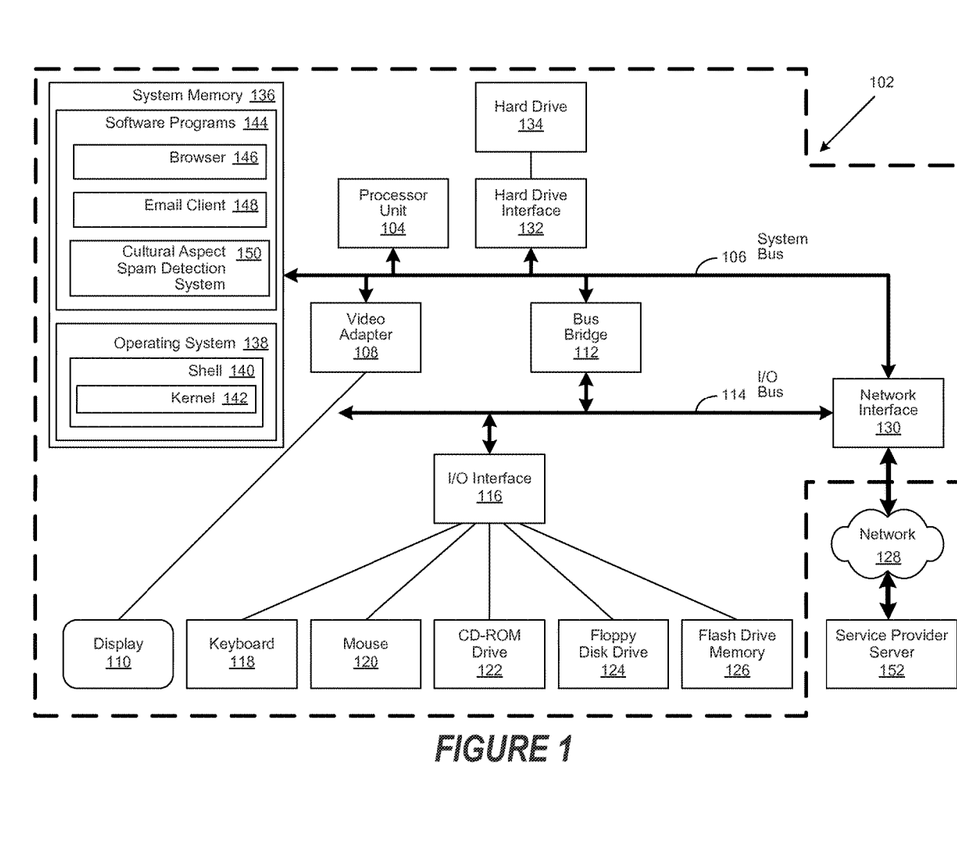
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a cultural aspect spam detection system 150. In these and other embodiments, the cultural aspect spam detection system 150 includes code for implementing the processes described hereinbelow. In one embodiment, client computer 102 is able to download the cultural aspect spam detection system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
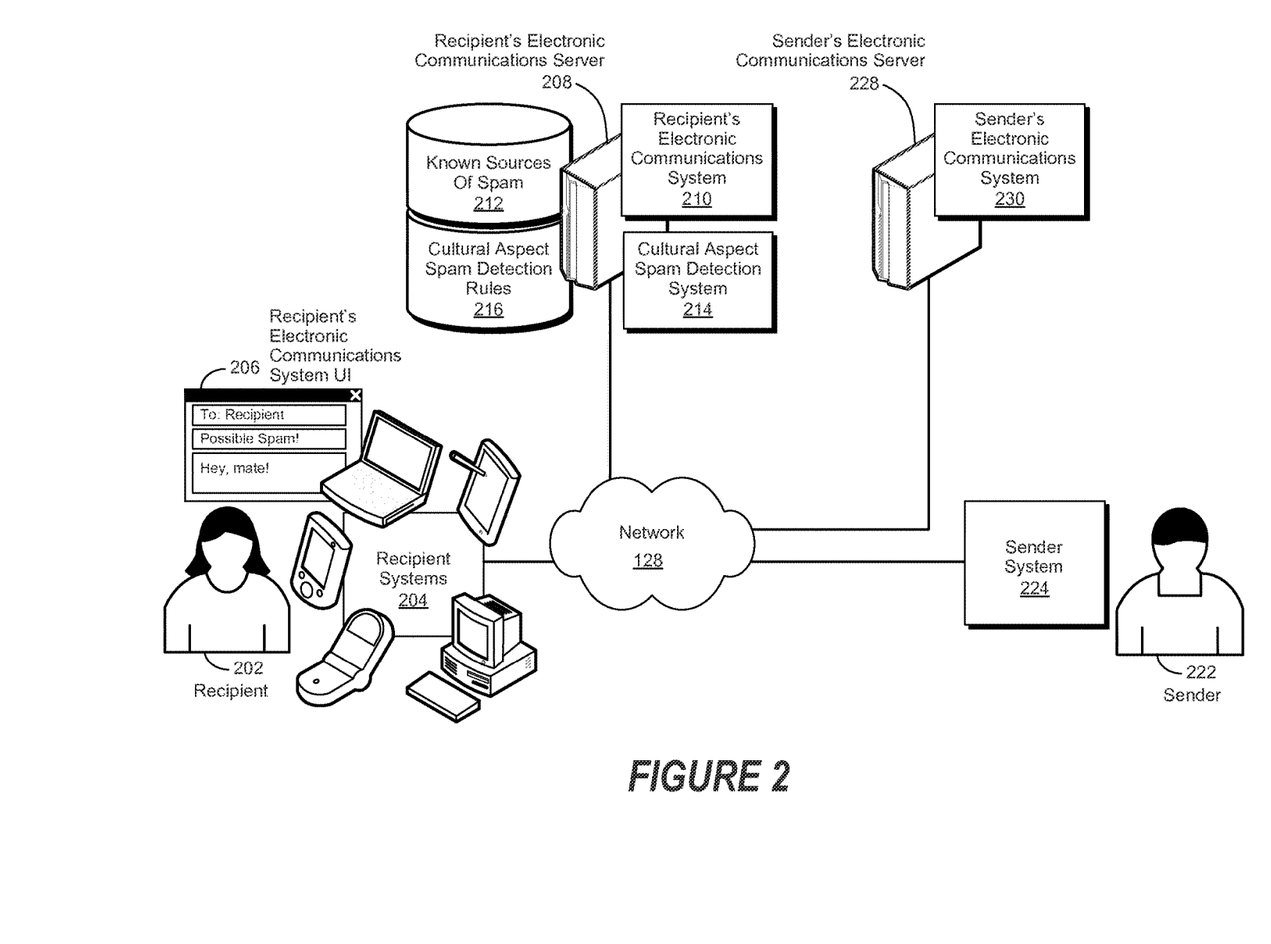
FIG. 2 is a simplified block diagram of the performance of cultural aspect spam detection operations.

FIG. 2 is a simplified block diagram of a cultural aspect spam detection system implemented in accordance with an embodiment of the invention. As used herein, a cultural aspect broadly refers to an individual aspect of a people's religion, spirituality, rituals, formalities, salutations, demographics, economy, family and community life, government, sports, foods, art, or other parts of their culture. For example, certain salutations related to formalities, religion, age, or seniority may be expected in an electronic communication exchanged by two members of the same culture.

As likewise used herein, an electronic communication refers to any communication exchanged between two users in an electronic form that is capable of communicating spam. Examples of such electronic communications include electronic mail (email), instant messaging (IM), online chat, or Short Message Service (SMS) messages. Other forms of electronic communications include posts on social network sites, online forums, blogs and microblogs. All of these are conducive to the delivery of spam, which can be harmful to users in many ways. Skilled practitioners of the art will recognize that many such forms of electronic communication exist and the foregoing is not intended to limit the spirit, scope or intent of the invention.

In various embodiments, data associated with predetermined cultural aspects corresponding to a recipient or a sender of an electronic communication are processed to generate spam detection rules. In certain embodiments, this cultural aspect data may be received from the sender of an electronic communication. As an example, the sender of an electronic communication may append cultural aspect information to the electronic communication in the form of contact information. One such example of contact information that can be appended to an electronic communication is a vCard, which is an electronic business card format defined by the Microsoft Corporation® of Redmond, Wash. In certain embodiments, cultural aspect data may be received from the recipient of an electronic communication. As an example, the recipient may append cultural aspect data to various contacts listed in an electronic communications system.

The spam detection rules are then used to detect electronic communications that may be spam. In certain embodiments, spam detection rules associated with both the recipient and the sender of the electronic communication are used to detect electronic communications that may be spam. As an example, different cultures expect the use of certain salutations. To further the example, user 'A' sees a social media wall post from a Muslim friend, user 'B.' Since user 'A' is Muslim, a spam detection rule has been generated that electronic communications from another Muslim should begin with "Salaam," which is the universal greeting used by Muslims around the world. Accordingly, if the social media wall post from user 'B' does not begin with "Salaam," then it is marked as possible spam. In this example, user 'A' is then alerted to the possibility that the wall post may be spam, and as a result, can take a closer look at the content of the wall post. Upon review of the wall post, user 'A' may determine it is spam due to the absence of "Salaam" as a salutation and therefore decide to not interact any further with the wall post.

As another example, user 'C' receives an online chat request from user 'D,' both of whom are Chinese. A spam detection rule has been generated for user 'C' that electronic communications from younger users should begin "Nin Hao" instead of "Ni Hao." Therefore, if the online chat request user 'D,' who is much younger than user 'C,' does not address user 'C' with "Nin Hao," or uses no salutation at all, then it is identified as possible spam. As still another example, user 'E' is a Japanese department manager who receives an email from user 'F' who is one of his employees. Since user 'E' is a manager, a spam detection rule has been generated that electronic communications from employees should begin with "Sama." If not, then the email is identified as possible spam. As another example, user 'G' sees a post from user 'H,' an American friend. Since user 'H' is American, a spam detection rule has been generated that "Hi," "Hello," or other informal greetings are typical for any electronic communications from an American. As a result, the email from user 'H' is not marked as possible spam if it begins with an informal salutation.

In this embodiment, a recipient 202 uses one or more associated recipient systems 204 to receive an electronic communication originated by a sender 222 using an associated recipient system 224. In various embodiments, the electronic communication is composed by the sender 222 on an associated system 224, which then uses a network 128, such as the Internet, to communicate the electronic communication to the sender's electronic communications server 228, which includes the sender's electronic communications system 230.

In various embodiments, the recipient system 224 or the sender system 224 may include a personal computer, a laptop computer, or a tablet computer operable to use network 128 to receive or send an electronic communication. The recipient system 224 or the sender system 224 may also include a personal digital assistant (PDA), a mobile telephone, or any other suitable device operable to use network 128 to receive or send an electronic communication. In various embodiments, the network 128 may include a public network, such as the Internet, a physical private network, a virtual private network (VPN), a wireless network (e.g., WiFi, 3G, LTE, Bluetooth, etc.) or any combination thereof. Skilled practitioners of the art will realize that many such embodiments are possible and that the foregoing is not intended to limit the spirit, scope or intent of the invention.

Once the sender's electronic communications system 230 receives the electronic communication, it then uses the network 128 to communicate the electronic communication to the recipient's electronic communications system 210, which is implemented the recipient's electronic communication server 208. In various embodiments, the recipient's communication server 208 may also include a cultural aspect spam detection system 214, a repository of cultural aspect spam detection rules 216, and a repository of known sources of spam 212. In certain embodiments, the cultural aspect spam detection system 214, the repository of cultural aspect spam detection rules 216, and the repository of known sources of spam 212 may be implemented on one or more servers that are communicatively coupled to the recipient's electronic communications server 208 through the network 128.

In various embodiments, data associated with predetermined cultural aspects, described in greater detail herein, are received by the cultural aspect spam detection system 214, where it is then processed to generate cultural aspect spam detection rules. In certain embodiments, the resulting cultural aspect detection rules are stored in the repository of cultural aspect spam detection rules 216, where they are accessed by the cultural aspect spam detection system 214 to perform cultural spam detection operations.

In various embodiments, the cultural aspect spam detection rules may include rules associated with terms of salutation, greetings and languages for various cultures. In certain embodiments, predetermined users, such as recipient 202 or sender 222, may have associated rules that correspond to preferences for the salutation, greetings and languages which they know and use, or recognized based upon natural language processing and text retrieval.

In various embodiments, the cultural aspect spam detection rules may include rules that identify common disclaimers, signatures, etc. to establish the origin or confidence of an incoming electronic communication. In certain embodiments, the cultural aspect spam detection rules are divided into multiple dimensions. For example, they may be organized by culture, by age, or seniority within a corporation's organizational chart. In various embodiments, the cultural aspect spam detection rules may be stored in a social network's directories or email contacts repositories.

In these and other embodiments, inbound electronic communications are received on an ongoing basis by the recipient's electronics communications system 210, where they are then routed to the cultural aspect spam detection system 214 for processing. First, the sender 222 and the recipient 202 of the inbound electronic communication are determined. Then a determination is made whether the sender 222 is a known source of spam. If so, then the inbound electronic communication is marked as possible spam prior to delivery to the recipient 222. In various embodiments, the cultural aspect spam detection system 214 uses the repository of known sources of spam 212 to determine whether the sender 222 of the electronic communication is a known source of spam. In certain embodiments, the name of the sender 222, their associated domain name, their Internet Protocol (IP) address, their membership in a social group, or any combination thereof, is used to determine whether the sender 222 of the electronic communication is a known source of spam.

However, if it is determined that the sender 222 of the electronic communication is not a known source of spam then it is processed to identify associated cultural aspects. Cultural aspect spam detection rules, described in greater detail herein, are then used by the cultural aspect spam detection system 214 to process the identified cultural aspects. In various embodiments, the cultural aspect spam detection system 214 compares the greeting, salutation and language (e.g., spelling, grammar, syntax, etc.) used in the electronic communication with the aforementioned cultural aspect spam detection rules to determine whether or not the electronic communication is spam. In certain embodiments, the cultural aspect spam detection system 214 uses prior communication between the recipient 202 and the sender 222, or a company's reporting chain information, to determine their respective age and working relationship. In these embodiments, the age and working relationship information is used in combination with the cultural aspect spam detection rules to determine whether or not the electronic communication is spam.

In various embodiments, the cultural aspect spam detection system 214 uses the recipient's 202 previous communications with the sender 222 to further model the pattern of communication with other senders of electronic communication. In these embodiments, the pattern of communication is used to either generate new, or modify existing, cultural aspect spam detection rules. In certain embodiments, the recipient 202 is provided the ability to review an electronic communication that has been marked as spam. In these embodiments, the recipient can either verify that the electronic communication is indeed spam or that it is not.

In one embodiment, the recipient 202 provides additional cultural aspect data related to either the recipient 202, or sender 222, subsequent to reviewing or verifying an electronic communication marked as possible spam. This additional cultural aspect data is then processed by the cultural aspect spam detection system 214 to either generate new, or modify existing, cultural aspect spam detection rules. For example, the recipient 202 may identify or add greetings, such as "Hey Mate," to identify a valid sender 222 of an electronic communication. It will be appreciated that the provision of additional cultural aspect data by the recipient 202 can contribute to the accuracy of the cultural aspect spam detection system 214 in detecting electronic communications that may be spam.

In various embodiments, the cultural aspect spam detection system 214 uses one or more visual attribute to highlight the reasons for an electronic communication being marked as spam. For example, highlighting "Hi" in green, because it's good, of highlighting "Good Day Mate" in red, because it's bad. In certain embodiments, the cultural aspect spam detection system 214 applies a spam confidence value to the electronic communication. For example, a '5' spam confidence value may indicate a high degree of certainty that the electronic communication is spam while a '1' spam confidence value may indicate a low degree of certainty. In one embodiment, electronic communications marked as spam are grouped together within a window of the recipient's 202 electronic communications system user interface (UI) 206. In another embodiment the, the electronic communications marked as spam are displayed according to their respective spam confidence value. In yet another embodiment the, the electronic communications marked as spam are displayed prior to electronic messages that are not marked as spam. In still another embodiment the, the electronic communications marked as spam are displayed after electronic messages that are not marked as spam. Those of skill in the art will recognize that many such embodiments are possible and the foregoing is not intended to limit the spirit, scope or intent of the invention.

In certain embodiments, the cultural aspect spam detection system 214 alerts the recipient 202 during both formal and familiar communications within a single electronic communication by providing cues. For example, social cues may help a person correct the form and manner of communicating in interpersonal communications, but such social cues are typically not available when using electronic communications. In various embodiments, the cultural aspect spam detection system 214 may further analyze audio, video or multimedia communications to determine whether or not the electronic communication is spam. An example is visual voicemail. In certain embodiments, the cultural aspect spam detection system 214 may use the context of the group (e.g., the main topic of a discussion) to further detect spam.

Figure 3A:
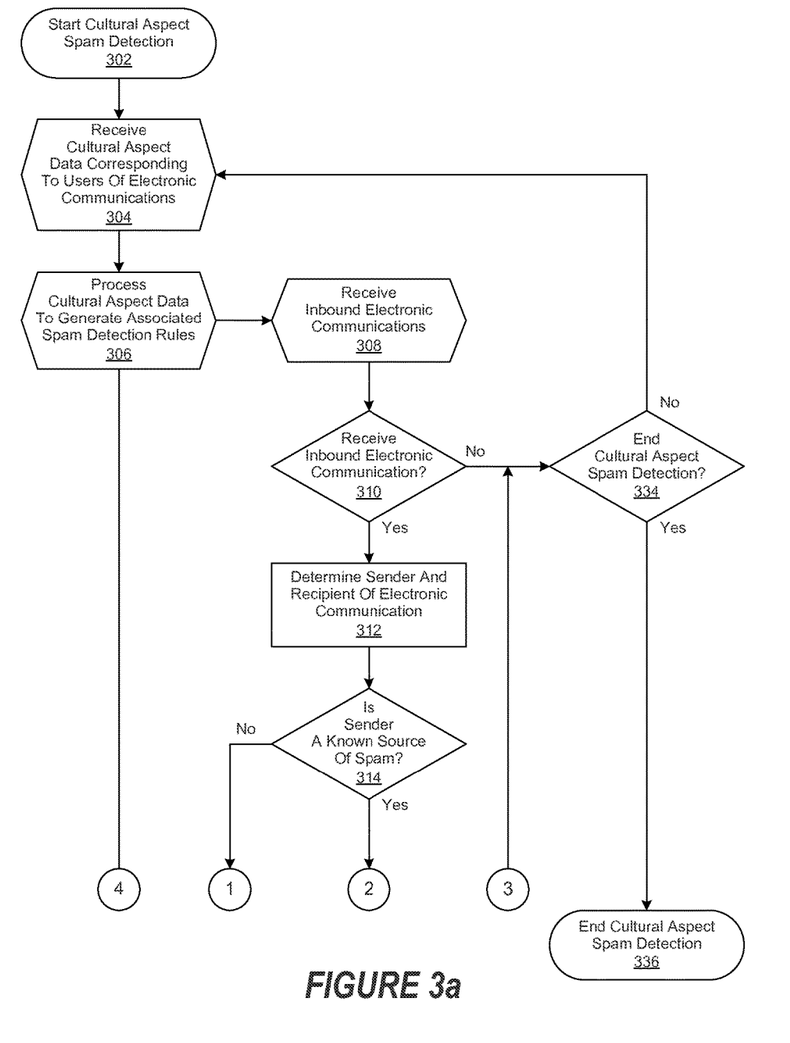
FIGS. 3a and 3b are a generalized flowchart of the operation of a cultural aspect spam detection system.
Figure 3B:
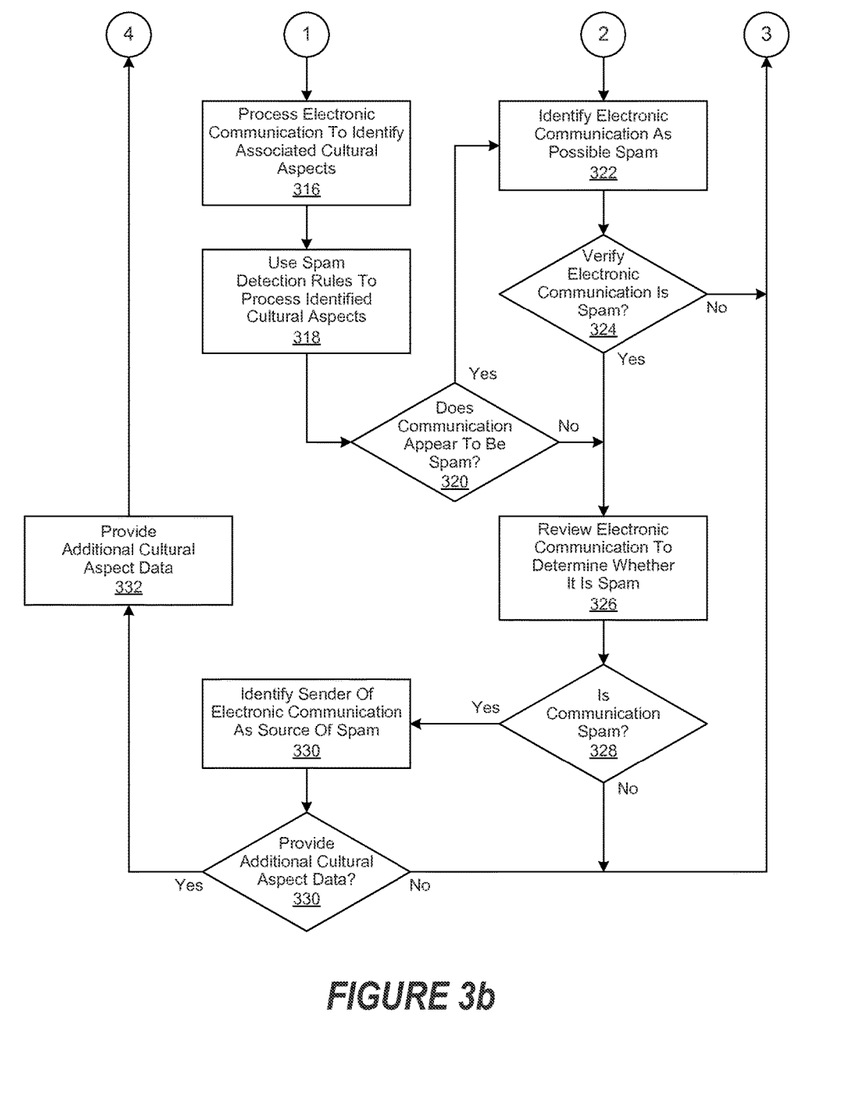

FIGS. 3a and 3b are a generalized flowchart of the performance of cultural aspect spam detection operations implemented in accordance with an embodiment of the invention. In this embodiment, cultural spam detection operations are begun in step 302, followed by the receipt of data associated with predetermined cultural aspects, described in greater detail herein, corresponding to users of electronic communications in step 304. The cultural aspect data is then processed in step 306 to generate cultural aspect spam detection rules, likewise described in greater detail herein. Inbound electronic communications are then received on an ongoing basis in step 308, followed by a determination being made in step 310 whether an inbound electronic communication has been received. If not, then a determination is made in step 334 whether to end cultural aspect spam detection operations. If not, then the process is continued, proceeding with step 304. Otherwise, cultural aspect spam detection operations are ended in step 336.

However, if it was determined in step 310 that an inbound electronic communication has been received, then the sender and the recipient of the inbound electronic communication is determined in step 312. A determination is then made in step 314 whether the sender is a known source of spam. If so, then the inbound electronic communication is marked as possible spam in step 322. A determination is then made in step 324 whether to verify that the inbound electronic communication is spam. If not, then the process is continued, proceeding with step 334. Otherwise, the inbound electronic communication is reviewed in step 326 to determine whether it is spam. If it is not, then the process is continued, proceeding with step 334.

However, if it is determined in step 328 that the inbound electronic communication is spam, then the sender is identified as a source of spam in step 330. A determination is then made in step 330 whether to provide additional cultural aspect data. If not, then the process is continued, proceeding with step 334. Otherwise, additional cultural aspect data is provided in step 332 and the process is continued, proceeding with step 306.

However, if it was determined in step 314 that the sender of the inbound electronic communication is not a known source of spam, then the inbound electronic communication is processed in step 316 to identify cultural aspects associated with the sender. In certain embodiments, the cultural aspects include the name of the sender 222, their associated domain name, their Internet Protocol (IP) address, their membership in a social group, or any combination thereof. Cultural aspect spam detection rules, described in greater detail herein, are then used in step 318 to process the identified cultural aspects. A determination is then made in step 320 whether the inbound electronic communication appears to be spam. If so, then the process is continued, proceeding with step 322. Otherwise, the process is continued, proceeding with step 326.

Figure 4:
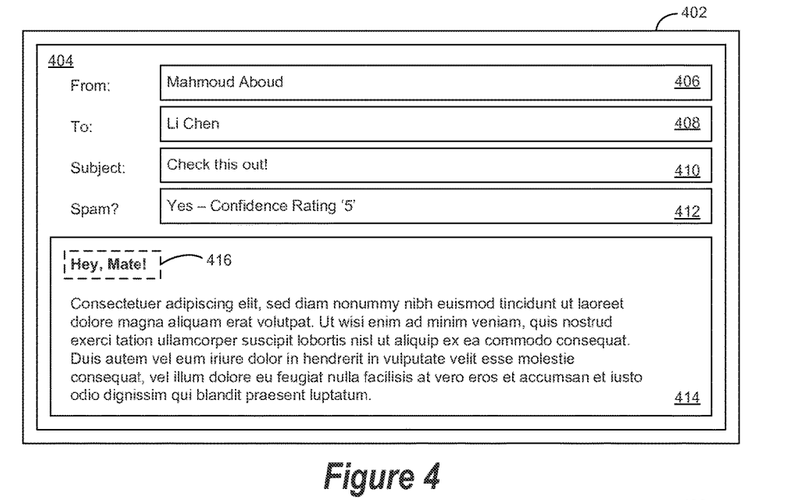
FIG. 4 shows the display of an electronic communication that has been detected as spam within a user interface.

FIG. 4 shows the display of an electronic communication that has been detected as spam within a user interface implemented in accordance with an embodiment of the invention. In various embodiments, cultural aspect spam detection operations are performed on incoming electronic communications to detect possible spam. In this embodiment, an electronic communication 404 has been identified as spam and is displayed within a user interface (UI) window 402 of the recipient's electronic communications system. As described in greater detail herein, cultural aspect spam detection rules are used to process data associated with the sender 406, the recipient 408, the topic of discussion (e.g., the subject of the electronic communication) 410 and the greeting 416 of the electronic communication text body 414.

In this embodiment, the sender 406 is Arabic and the recipient 408 is Chinese. However, the greeting 416 of "Hey Mate!" is typically associated with a sender who is Australian. As a result, the greeting 416 of "Hey Mate!" conflicts with cultural aspect spam detection rules of greetings typically used by a sender 406 who is Arabic, or that are expected by a recipient 408 that is Chinese. Accordingly, the electronic communication is notated 412 as being spam, with a spam confidence value of '5,' indicating a high level of confidence that is spam. In various embodiments, visual attributes are implemented to highlight the reasons for an electronic communication being marked as spam. For example, the greeting 416 may have a bold text attribute or a color attribute applied to it to signify it as the reason for the electronic communication 404 being notated 412 as spam.

Figure 5:
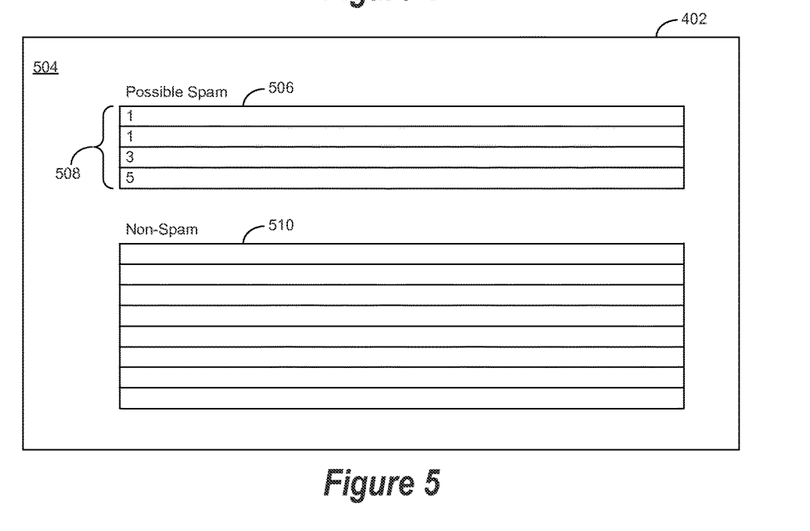
FIG. 5 shows the display of a plurality of electronic communications that have been detected as spam within a user interface.

FIG. 5 shows the display of a plurality of electronic communications that have been detected as spam within a user interface implemented in accordance with an embodiment of the invention. In certain embodiments, a spam confidence value 508 is applied to electronic communications that have been detected as spam. For example, a '5' spam confidence value may indicate a high degree of certainty that the electronic communication is spam while a '1' spam confidence value may indicate a low degree of certainty. In one embodiment, electronic communications marked as spam 506 are grouped together within a window 504 of the recipient's electronic communications system user interface (UI) 402. In another embodiment the, the electronic communications marked as spam are displayed according to their respective spam confidence value 508. In yet another embodiment the, the electronic communications marked as spam are displayed prior to electronic messages that are not marked as spam 510.

Although the present invention has been described in detail, it should be understood that various changes, substitutions and alterations can be made hereto without departing from the spirit and scope of the invention as defined by the appended claims.

What is claimed is:

1. A computer-implemented method for using culturally-based information to detect spam, comprising:

providing a cultural aspect spam detection system, the cultural aspect spam detection system comprising a recipient system, a recipient electronic communications server executing a recipient electronic communications system, a sender system, a sender electronic communication server executing a sender electronic communications system and a network, the recipient system, recipient electronic communications system, sender system and sender electronic communications system communicating electronic communications via the network;

determining a culture of a sender of an electronic communication, the determining being performed by a computer system;

performing spam detection operations on the electronic communication via the computer system to determine whether the electronic communication is spam, the spam detection operations comprising using a first set of cultural aspect spam detection rules corresponding to the culture of the sender;

marking via the computer system the communication as spam if the spam detection operations indicate that the electronic communication is not consistent with the culture;

processing via the computer system the electronic communication to identify the sender of the electronic communication as a source of spam, the identifying the sender of the electronic communication comprising associating additional cultural aspect data with the sender of the electronic communication, the processing performed in response to one member of the set of: receiving a request from the intended recipient of the electronic communication; and receiving confirmation from the intended recipient that the electronic communication is spam;

applying a spam confidence value to the electronic communication based upon if the spam detection operations indicate that the electronic communication is not consistent with the culture; and, presenting within a user interface the electronic communication according to the spam confidence value of the electronic communication; and wherein the culture is based on a relationship of the sender and the intended recipient.

2. The method of claim 1, further comprising:

determining a culture of the recipient of the communication; and using a second set of cultural aspect spam detection rules corresponding to the culture of the recipient to perform the spam detection operations.

3. The method of claim 2, wherein the culture of the sender is determined according to at least one member of the set of:

the location of the sender;
the Internet Protocol (IP) address of the sender;

a domain name associated with the sender;
membership of the sender in a social group; and,
information about the sender.

4. The method of claim 2, further comprising:
receiving cultural aspect data related to the recipient; the cultural aspect data related to the recipient and the additional cultural aspect data of the sender each comprising:
a culture;
a language;
a religion;
a title;
an age; and
a salutation associated with the culture.

5. The method of claim 1, wherein:
the relationship of the sender and the intended recipient is determined using prior electronic communications between the sender and the intended recipient.

6. The method of claim 5, wherein:
the electronic communications between the sender and the intended recipient are reviewed to determine an age of the sender, an age of the intended recipient and a working relationship between the sender and the intended recipient,
the age of the sender, the age of the intended recipient and the working relationship between the sender and the intended recipient are used when analyzing salutations in the communications to determine whether the salutations are as expected for members of the same culture.

7. A computer system comprising:
a processor;
a data bus coupled to the processor; and
a computer-usable medium embodying computer program code for using culturally-based information to detect spam, the computer-usable medium being coupled to the data bus, the computer program code used for using culturally-based information to detect spam and comprising instructions executable by the processor and configured for:
providing a cultural aspect spam detection system, the cultural aspect spam detection system comprising a recipient system, a recipient electronic communications server executing a recipient electronic communications system, a sender system, a sender electronic communication server executing a sender electronic communications system and a network, the recipient system, recipient electronic communications system, sender system and sender electronic communications system communicating electronic communications via the network;
determining a culture of a sender of an electronic communication, the determining being performed by the computer system;
performing spam detection operations on the electronic communication via the computer system to determine whether the electronic communication is spam, the spam detection operations comprising using a first set of cultural aspect spam detection rules corresponding to the culture of the sender; and
marking via the computer system the communication as spam if the spam detection operations indicate that the electronic communication is not consistent with the culture;
processing via the computer system the electronic communication to identify the sender of the electronic communication as a source of spam, the identifying the sender of the electronic communication comprising associating additional cultural aspect data with the sender of the electronic communication, the processing performed in response to one member of the set of: receiving a request from the intended recipient of the electronic communication; and receiving confirmation from the intended recipient that the electronic communication is spam;
applying a spam confidence value to the electronic communication based upon if the spam detection operations indicate that the electronic communication is not consistent with the culture; and,
presenting within a user interface the electronic communication according to the spam confidence value of the electronic communication; and wherein
the culture is based on a relationship of the sender and the intended recipient.

8. The system of claim 7, the instructions further comprising instructions for:
determining a culture of the recipient of the communication; and
using a second set of cultural aspect spam detection rules corresponding to the culture of the recipient to perform the spam detection operations.

9. The system of claim 8, wherein the culture of the sender is determined according to at least one member of the set of:
the location of the sender;
the Internet Protocol (IP) address of the sender;
a domain name associated with the sender;
membership of the sender in a social group; and,
information about the sender.

10. The system of claim 8, the instructions further comprising instructions for:
receiving cultural aspect data related to the recipient;
the cultural aspect data related to the recipient and the additional cultural aspect data of the sender each comprising:
a culture;
a language;
a religion;
a title;
an age; and
a salutation associated with the culture.

11. The system of claim 7, wherein:
the relationship of the sender and the intended recipient is determined using prior electronic communications between the sender and the intended recipient.

12. The system of claim 11, wherein:
the electronic communications between the sender and the intended recipient are reviewed to determine an age of the sender, an age of the intended recipient and a working relationship between the sender and the intended recipient,
the age of the sender, the age of the intended recipient and the working relationship between the sender and the intended recipient are used when analyzing salutations in the communications to determine whether the salutations are as expected for members of the same culture.

13. A non-transitory, computer-readable storage medium embodying computer program code for using culturally-based information to detect spam, the computer program code comprising computer executable instructions configured for:
providing a cultural aspect spam detection system, the cultural aspect spam detection system comprising a recipient system, a recipient electronic communications server executing a recipient electronic communications system, a sender system, a sender electronic communication server executing a sender electronic communications system and a network, the recipient system, recipient electronic communications system, sender system and sender electronic communications system communicating electronic communications via the network;

determining a culture of a sender of an electronic communication, the determining being performed by a computer system;

performing spam detection operations on the electronic communication via the computer system to determine whether the electronic communication is spam, the spam detection operations comprising using a first set of cultural aspect spam detection rules corresponding to the culture of the sender; and marking via the computer system the communication as spam if the spam detection operations indicate that the electronic communication is not consistent with the culture;

processing via the computer system the electronic communication to identify the sender of the electronic communication as a source of spam, the identifying the sender of the electronic communication comprising associating additional cultural aspect data with the sender of the electronic communication, the processing performed in response to one member of the set of: receiving a request from the intended recipient of the electronic communication; and receiving confirmation from the intended recipient that the electronic communication is spam;

applying a spam confidence value to the electronic communication based upon if the spam detection operations indicate that the electronic communication is not consistent with the culture; and, presenting within a user interface the electronic communication according to the spam confidence value of the electronic communication; and wherein the culture is based on a relationship of the sender and the intended recipient.

14. The non-transitory, computer-readable storage medium of claim 13, further comprising:
   determining a culture of the recipient of the communication; and
   using a second set of cultural aspect spam detection rules corresponding to the culture of the recipient to perform the spam detection operations.

15. The non-transitory, computer-readable storage medium of claim 14, wherein the culture of the sender is determined according to at least one member of the set of:
   the location of the sender;
   the Internet Protocol (IP) address of the sender;
   a domain name associated with the sender;
   membership of the sender in a social group; and,
   information about the sender.

16. The non-transitory, computer-readable storage medium of claim 14, the instructions further comprising instructions for:
   receiving cultural aspect data related to the recipient; the cultural aspect data related to the recipient and the additional cultural aspect data of the sender each comprising:
   a culture;
   a language;
   a religion;
   a title;
   an age; and
   a salutation associated with the culture.

17. The non-transitory, computer-readable storage medium of claim 13, wherein the computer executable instructions are deployable to a client system from a server system at a remote location.

18. The non-transitory, computer-readable storage medium of claim 13, wherein the computer executable instructions are provided by a service provider to a user on an on-demand basis.

19. The non-transitory, computer-readable storage medium of claim 13, wherein:
   the relationship of the sender and the intended recipient is determined using prior electronic communications between the sender and the intended recipient.

20. The non-transitory, computer-readable storage medium of claim 19, wherein:
   the electronic communications between the sender and the intended recipient are reviewed to determine an age of the sender, an age of the intended recipient and a working relationship between the sender and the intended recipient,
   the age of the sender, the age of the intended recipient and the working relationship between the sender and the intended recipient are used when analyzing salutations in the communications to determine whether the salutations are as expected for members of the same culture.

* * * * *